No. 895,289. PATENTED AUG. 4, 1908.
J. H. & A. McLEOD.
WEIGHING SCALE.
APPLICATION FILED OCT. 11, 1907.

WITNESSES
F. C. Barry
Samuel E. Wade

INVENTORS
JOHN H. McLEOD
ANGUS McLEOD
BY
ATTORNEYS

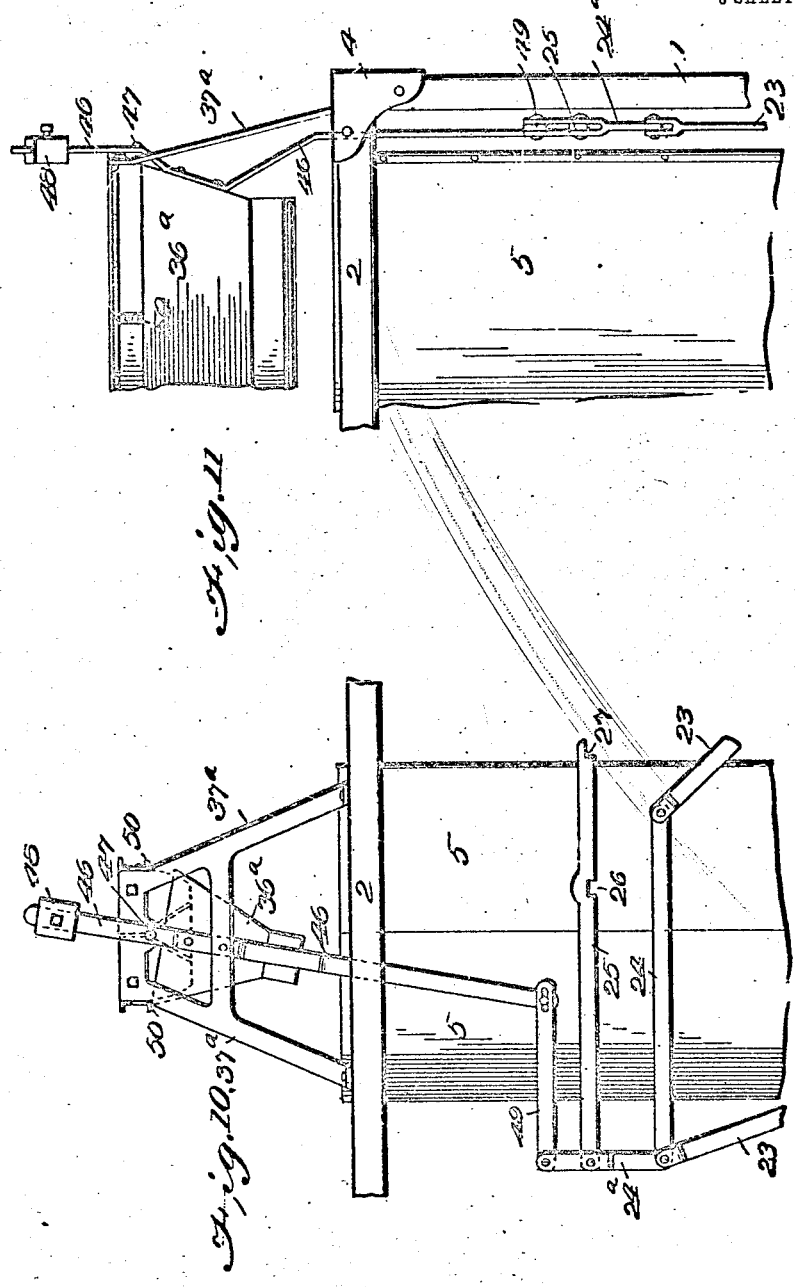

UNITED STATES PATENT OFFICE.

JOHN H. McLEOD, OF LA SALLE, AND ANGUS McLEOD, OF PERU, ILLINOIS.

WEIGHING-SCALE.

No. 895,289.    Specification of Letters Patent.    Patented Aug. 4, 1908.

Application filed October 11, 1907. Serial No. 396,927.

*To all whom it may concern:*

Be it known that we, JOHN H. McLEOD and ANGUS McLEOD, citizens of the United States, and residents, respectively, of La Salle and Peru, in the county of Lasalle and State of Illinois, have invented an Improvement in Weighing-Scales, of which the following is a specification.

Our invention is an improved automatic scale for weighing cement, coffee, grain, and other commodities.

The invention is embodied in the construction, arrangement and combination of parts hereinafter described and illustrated in the accompanying drawings, in which—

Figure 1:
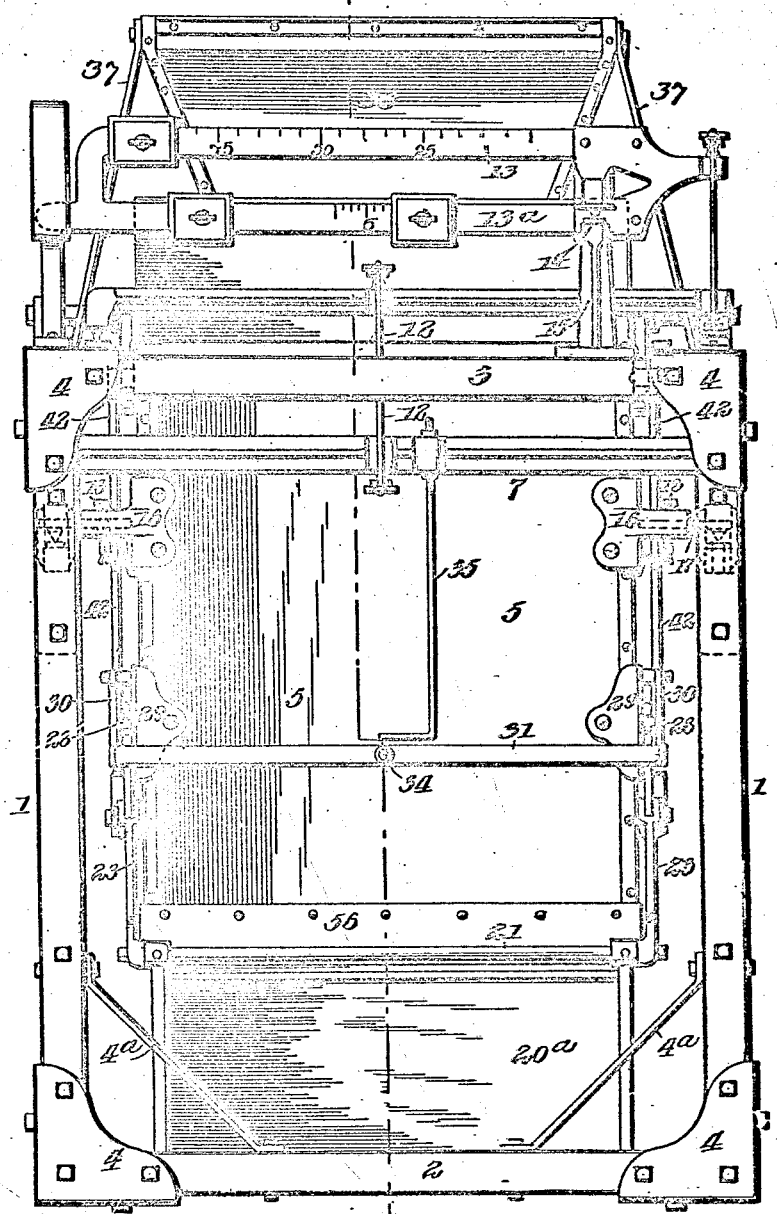
Figure 2:
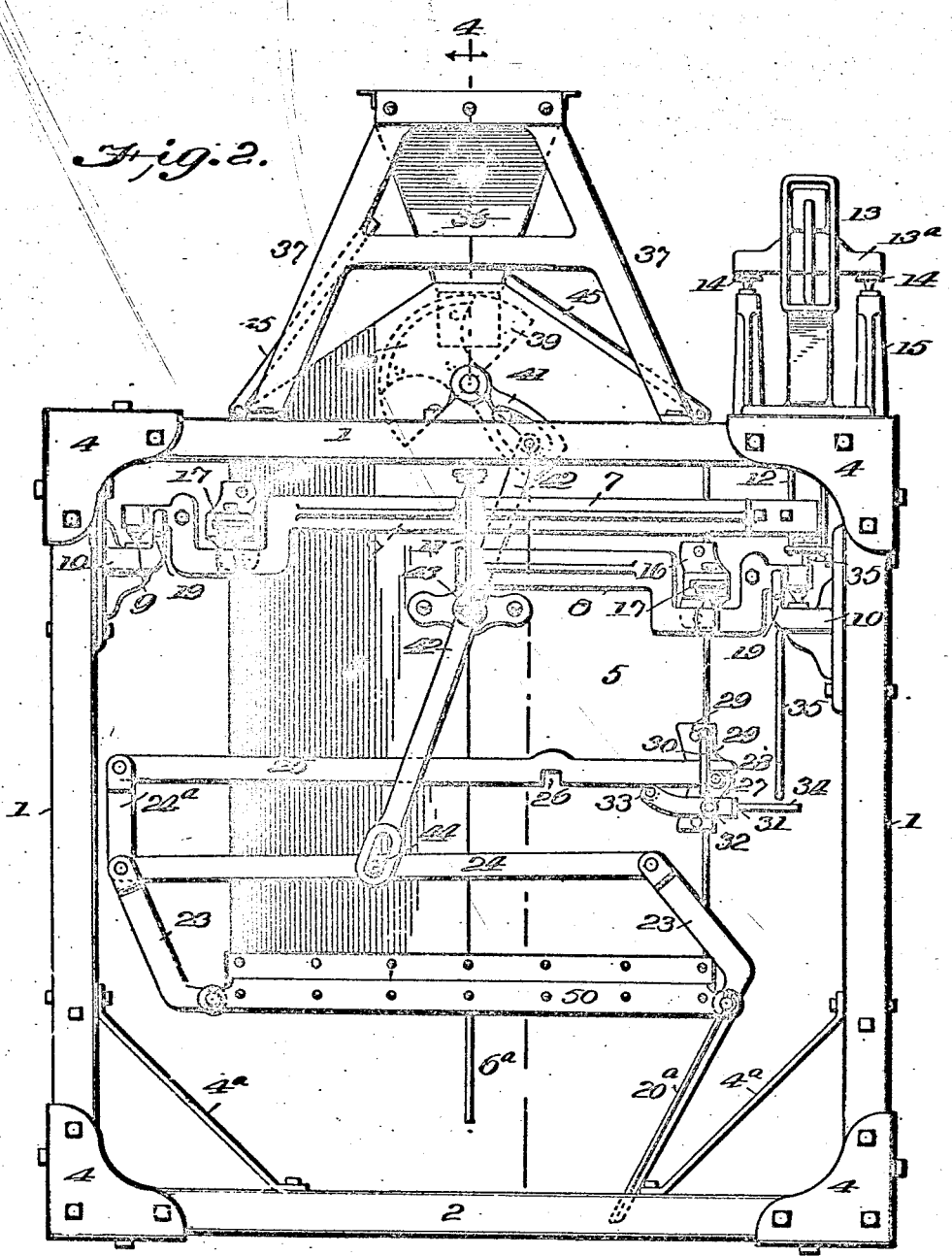
Figure 3:
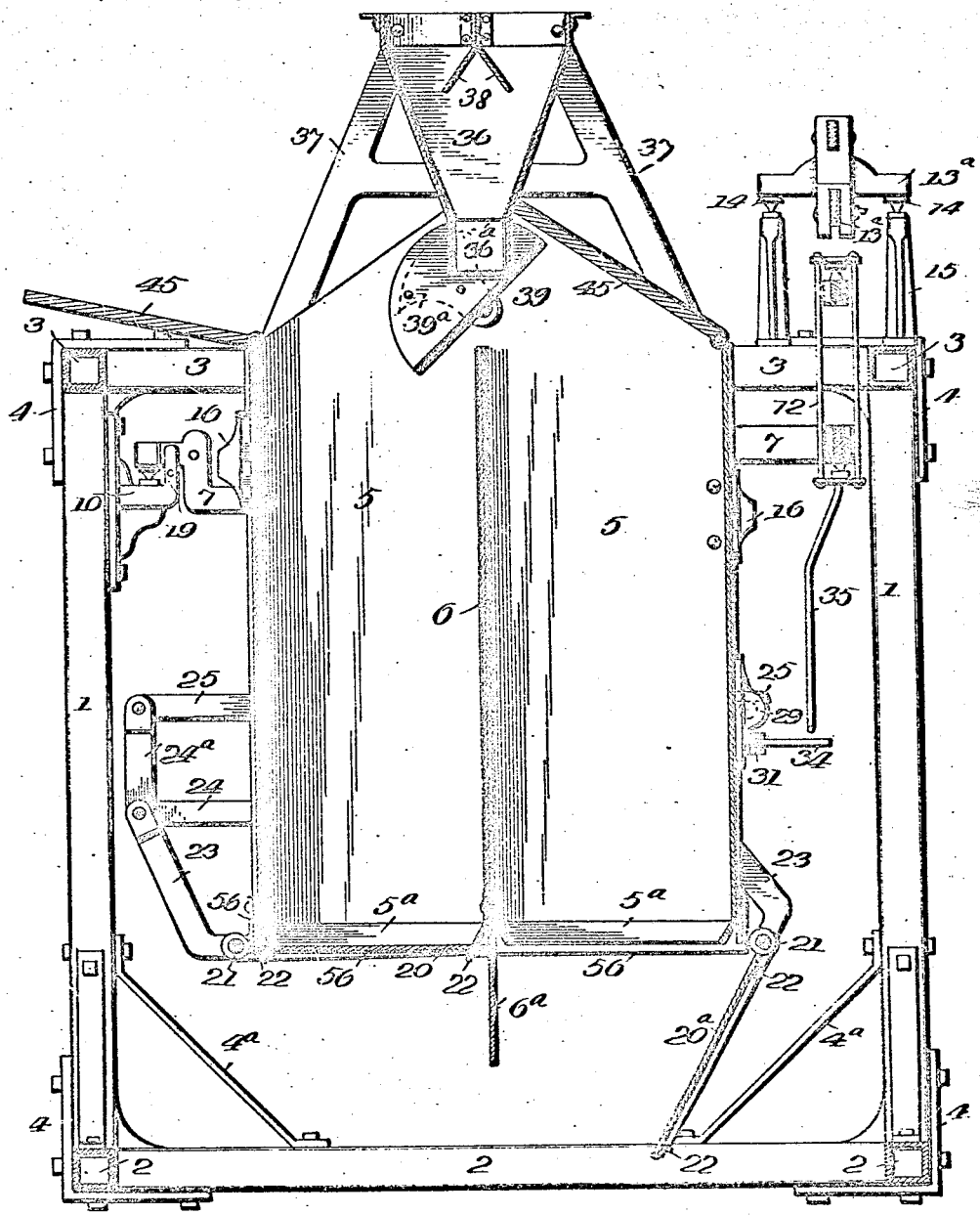
Figure 4:
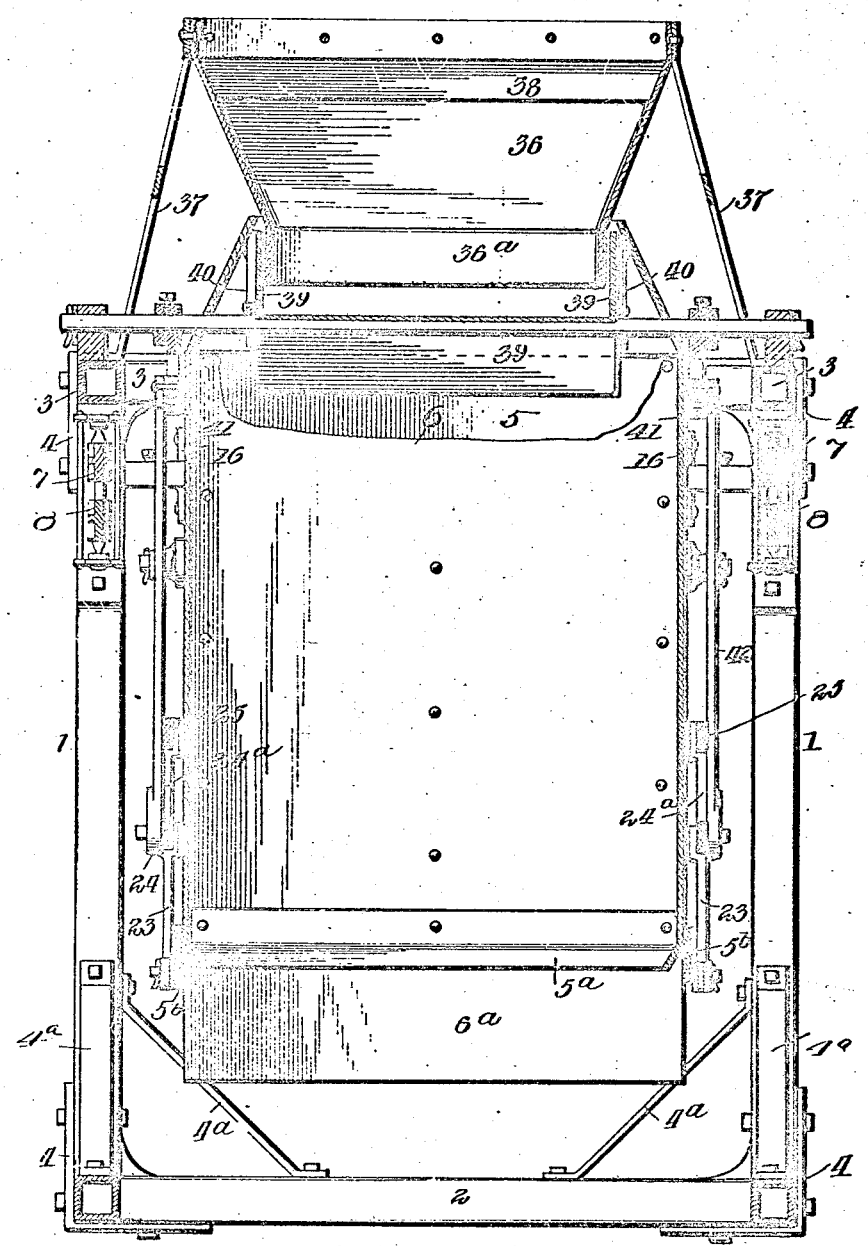

Figure 1 is a front side view of our scale. Fig. 2 is a side view taken at right angles to the view shown in Fig. 1. Fig. 3 is a vertical section on the line 3—3 of Fig. 1. Fig. 4 is a vertical section on the line 4—4 of Fig. 2. Fig. 5 is a horizontal section of the weighing hopper. Figs. 6 and 7 are detail views of the bearings or supports attached to the weighing hopper. Figs. 8 and 9 are detail views of brackets with which the bearings shown in Figs. 6 and 7 coact. Fig. 10 is a side view showing a modification, and Fig. 11 is a side view of the same taken at right angles to the view shown in Fig. 10.

The frame of the scale is rectangular and comprises four corner posts 1, bottom bars 2 and top bars 3, these parts being connected at the corners of the frame by castings 4, which are secured by bolts. Inclined steel braces 4ᵃ connect the posts with the bottom bars or sills 2 as shown. The posts and bars are square in cross section and made of seamless steel tubes, whereby they combine maximum strength with minimum weight. The weighing hopper 5 has two vertical compartments, the same being separated by a central partition 6; see Fig. 3. This hopper is supported by bearings, which will be presently described, upon weighing levers 7 and 8, these being arranged in pairs on opposite sides of the hopper. As shown best in Fig. 2, the upper and longer weighing levers are pivoted at 9 on brackets 10 attached to posts 1 and the shorter and lower levers 8 are similarly pivoted on brackets 10 attached to opposite posts. The free ends of the shorter levers 8 are connected by stirrups 11 with the central portion of the longer levers 7 and the free end of the latter bears upon a stirrup 12, which as shown in Fig. 1 extends upward and connects intermediately with graduated levers 13 and 13ᵃ, the latter being rigidly connected but spaced apart and pivoted at 14 on brackets or posts 15 supported on the front top bar of the frame. Our present invention does not immediately concern these parts but for a more detailed description of the graduated levers and their coöperation with the weighing levers, reference may be made to our Patent No. 706,442, dated August 5th, 1902.

The bearings of the weighing hopper 5 by which it is connected with and supported upon the weighing levers, comprise (see Figs. 1, 2, 6, 7), castings or brackets 16, bearing arms 17 and cup brackets 10,—see Figs. 8 and 9—the latter being secured to the posts 1 as before stated. The castings 16 are provided with lateral arms or projections which are cored or provided with sockets for receiving the bearing arms 17, the latter being adjustable longitudinally as shown in Fig. 7 and secured by a clamp screw 18. The arms 17 are provided with a cup which is adapted to receive and bear upon a steel point inserted in the weighing levers 7 and 8; and the fixed brackets 10 are similarly provided with a cup for receiving the steel points of the weighing levers 7 and 8. The castings 10 are provided with vertical forks 19 which are spaced apart to receive the ends of the weighing levers 7 and 8 as shown in Fig. 2. Thus said arms serve as cross guides or guards, preventing the pivots of the levers from being thrown laterally out of the cup bearing provided by brackets 10, which is liable to occur during shipment of the machine or while lifting or moving it. The body of the hopper 5 is made of four pieces of sheet iron suitably bent to form rectangular compartments, the plates being riveted together as indicated in Fig. 5. The backs of the two compartments form the double partition 6. As indicated in Figs. 4, 5, the lower edges of the hopper are bent inward at an angle of about 30° so that the bottom of each compartment has converging edges, whereby the cement or grain is caused to discharge in a smaller or more concentrated stream than would be otherwise possible. A band 5ᵇ is attached to the bottom of the hopper and extends around the same and depends a little below the converging portion 5ᵃ as shown in Fig. 3. This band thus forms a lip or flange on each side of the hopper, inside of which each gate closes, thus forming a double check, preventing fine cement or other material from leaking out of the hopper. For the same purpose and also to serve as a guide for the discharging stream of cement or other material, the partition 6 is provided with a vertical downward extension 6ª, the same being arranged and riveted between the inner walls of the compartments. Each of the compartments is provided with a gate, the two being indicated respectively by numbers 20 and 20ª, see especially Figs. 2 and 3. Each gate is made of a flat steel plate and is adapted to close upward close against the converging edge 5ª of the hopper compartments as shown at the left in Fig. 3. The gates are hinged by a rod 21 to castings secured to the lower corners of the hopper and they are stiffened transversely by strips of angle iron 22 riveted thereto as shown in Fig. 3.

The pivots 21 of the gates are detachable from the castings, being secured by cotter pins. The gates are provided with similar arms 23 which are bent at an obtuse angle and extend upward as shown. The ends of these arms are connected by a bar 24, one of whose ends is extended at a right angle upward as shown at 24ª, Figs. 2, 3. To such arm 24ª is pivoted a catch or catch bar 25 that extends horizontally across the side of the hopper, there being preferably but one on each side of the hopper, so that if one fails to operate the other will. This bar is provided with two notches 26 and 27, one being at the free end of the bar and the other a short distance therefrom. The bar is adapted to ride upon a roller 28 mounted upon a stud attached to a casting 29 secured to the hopper 5 and the casting is also provided with a guard 30 to prevent lateral movement of the bar 25, or in other words, for holding it in due engagement with the roller 28. As shown in Fig. 2 the outer notch 27 of the catch bar 25 is engaged with the roller 28 and thus through the medium of the angle connecting bar 24 the left hand gate 20 is held closed and the other gate 20ª open; see also Fig. 3. In such position of the gates 20, 20ª, it is obvious that the left hand compartment is closed and adapted to receive cement, grain or other article while the opposite or right hand compartment is open so as to discharge its contents.

The catch bars 25 are tripped, that is to say, disengaged from the rollers 28, by a device which may be termed a trip bar 31, the same extending across the front of the hopper as shown in Fig. 1 and having its end portions bent at right angles and extended inward on the sides of the hopper. The arms thus formed are pivoted at 32 to the brackets 29 and their free ends are provided with rollers 33 that work in contact with the under side of the catch bars 25. The central portion of the bar 31 is provided with a forward horizontal extension 34, see Figs. 1, 2, and with this a vertical trip bar 35 coacts; said bar extends upward and is connected with the front bar connecting the longer weighing levers 7 and its lower end is bent laterally as indicated in Fig. 1. It is obvious that when the longer weighing levers 7 are carried down by a weight of material in the weighing hopper 5, the rod 35 will descend and bear down upon the arm 34 of the pivoted trip bar 31, whereby the catch bar 25 will be raised and released from the rollers 28, whereupon the catch bar will slide through the loop 30 until its notch 26 engages the roller 28. It will be understood that the weight of the cement or other material in the closed compartment of the hopper, bearing down upon the closed gate of such compartment, serves as the motive agent for effecting such shifting of the catch bar and of course effects simultaneously the closing of the opposite gate. In other words, when the gates and their connections are in the position indicated in Figs. 1 and 2, so soon as the left hand compartment is filled with a predetermined weight of material, the weighing levers 7 and 8 will be depressed, the hopper thereby descending slightly and the trips 35 and 31 causing release of the catch bars 25 from the rollers 28, and the weight of grain in the left hand hopper opening the gate 20 and simultaneously closing the gate 20ª, while the connections 24 and 25 are shifted to the right, as will be readily understood.

The weight of the connecting bar 31 and the arm 32 attached thereto, overbalances the weight of its arms that are pivoted to the bracket 29, so that the rollers 33 are always held in working contact with the catch bars 35. If one of the catch bars fails for any reason to properly engage the roller 28, the other on the opposite side will hold the load until the trip acts. Hinged covers 45 at top of hopper 5 prevent loss of fine material when closed. One is shown open and the other closed. The loop guide 30 in which the catch bar 25 slides, is extended downward and serves as a stop limiting the upward movement of the arms on the trip bar 31, so that the rollers 33 will not enter the notches 26 in the catch bar as it slides through the loop in the manner already described.

A receiving hopper 36, see Figs. 2, 3, 4, is arranged above the weighing hopper and fixed in position, it being supported upon a supplemental A-frame 37, that is in turn fixed and supported on the top bars 1 of the main frame. In the top portion of such hopper we arrange two horizontal obtuse angle plates 38, the same being arranged centrally and their inclined portions projecting toward the opposite sides of the hopper. The distance between their lower edges and the sides of the hopper is less than the width of the throat 36ª of said hopper, so that they will serve to arrest stones or other foreign material which are too large to pass through the throat 36ª, which would obviously reduce the feed too much. The material passing through the throat 36ª discharges directly upon a device 39 which in view of its function is termed a deflector. It consists of a plate pivoted in the opposite sides of the weighing hopper 5 and having side guides 39ª to which counterbalance weights 40 are attached.

The deflector proper is provided with a slotted arm 41, see Fig. 2, which arm is extended at right angles to the plane of the plate or body of the deflector. A shifting bar 42 is pivoted to a bracket 43 on the side of the hopper and one end engages such slotted arm of the deflector while the other engages a pin 44 fixed on the connecting bar 24. The lower end of the said bar is slotted to allow due play for the pin 44 and the upper end is provided with a roller to reduce friction when in contact with the slotted arm 41. This bar 42 serves as a means for shifting the deflector from one inclination to another. Thus in Figs. 2 and 3 the deflector 39 is shown inclined to the left and therefore in position to discharge into the left hand compartment. When that compartment has been filled with a weight of material sufficient to overbalance the weight of the graduated levers 13, 13ª, the hopper will descend and the gate 20 will open thereby throwing the connecting bar 24 to the right, which will shift the bar 42 on its pivot to the opposite position, and this will effect the shifting of the deflector 39 by reason of the engagement of the bar 42 with its slotted arm 41. Thus when the gate 20 opens, the gate 20ª is closed and the deflector is simultaneously shifted from left to right and will then discharge material into the right hand compartment. When that shall have been filled, the operation will be repeated, the gate 20ª opening and the gate 20 closing, while the deflector will be shifted back to the position shown in full lines in Figs. 2 and 3. Thus the operation of the scale is entirely automatic, one compartment filling as the other discharges and vice versa. As shown in Fig. 3 the deflector is in contact with the lower end or throat portion of the fixed hopper 36, which thus serves as a stop limiting its throw and holding its slotted arm in such position. Thus the deflector arm 41 is held out of contact with the roller in the end of the shifting bar 42 at the time the machine is weighing, and hence no pressure is brought to bear on the slotted arm 41 until the hopper discharges. It may be stated in this connection that the machine may be operated manually with any weight of grain in either compartment of the hopper, it being only necessary for the operator to depress the lever arm 34 and thus raise the catch bar 25 out of engagement with the roller 28.

In Figs. 10 and 11 is shown a modification in which the weighing hopper 5, the gates and their connections, to wit, bar 24 and catch bar 25, are constructed, arranged and operated as already described. In this instance in place of employing a deflector the upper hopper 36ª is pivoted and adapted to swing in place of being fixed in position as before. The hopper is attached to weighted bars 46 that are pivoted at 47 in the frame 37ª. Weights 48 are attached to the top ends of the bars and their lower ends are connected by a bar 49 with an upward extension of the arm 24ª of the bar 24 that connects the gate arms 23. When one gate opens and the other closes an upper side edge of the hopper 36ª strikes a stop 50 fixed on the frame 37ª, and when the hopper moves in the other direction by the operation of the gates, it contacts with the opposite stop 50. The hopper is held in such position against the check or stop 50 until the required weight of material has been received into the weighing hopper. Thus no pressure is brought against the lever or bar 46 until the machine discharges. Deflectors and arresters for material too large to pass the throat of the hopper, are provided in this case as in the machine first described.

We claim—

1. The improved weighing scale comprising a supporting frame, weighing and graduated levers, a weighing hopper supported on the weighing levers and divided into compartments, hinged gates for said compartments for controlling the filling and discharge of the same, means for connecting the two gates so that they open and close alternately, a catch bar operatively connected with the gates, a fixed device on the hopper with which the said catch bar is adapted to engage, a trip bar attached to the hopper and adapted to disengage the catch bar when a compartment is filled, substantially as described.

2. The improved weighing scale comprising a frame, weighing and graduated levers, a weighing hopper supported on the weighing levers and divided into compartments, gates hinged to the hopper and adapted to open and close the same alternately, means for connecting the gates so that they move together in opening and closing, a catch bar connected with the gates, a fixed device on the hopper with which said catch bar is adapted to engage, whereby the gates are held alternately in the open and closed position, a trip mechanism for disengaging the catch bar from said device when a hopper compartment is filled with the required weight of material, said mechanism being connected with the weighing levers and thus brought into action automatically when the hopper descends with its load, substantially as described.

3. The improved weighing scale comprising a supporting frame, weighing and graduated levers arranged therein, a weighing hopper supported on the weighing levers, a gate for alternately opening and closing the hopper, a catch bar connected with the gate and a fixed device on the hopper with which said catch bar is adapted to engage, a trip bar 31 for disengaging the catch bar and allowing the gate to open when the hopper is filled with the required weight of material, and a device connected with the weighing lever and arranged to act on the trip bar whereby it is actuated automatically as the hopper descends, substantially as described.

4. The improved weighing scale comprising a supporting frame, weighing and graduated levers arranged therein, a weighing hopper supported on the weighing levers and divided into compartments, hinged gates for alternately opening and closing the respective hoppers, said gates being provided with extended arms, a bar connecting said arms so that the two gates swing together, one closing as the other opens, a catch bar pivotally connected with the gates and provided with two notches, a fixed device on the hopper with which the notches are adapted to engage, a trip bar pivoted on the hopper and arranged to lift the catch bar out of engagement with said device and a rod connected with the weighing lever for actuating such trip bar automatically as the hopper descends with its load, substantially as described.

5. In a weighing scale, the combination with a hopper having a central vertical partition, and pivoted gates for closing the discharge ends of the compartments thus formed, said gates having extended arms, of a bar connecting the gate arms whereby one gate is closed as the other opens, and a catch bar or locking device connected with the gates and serving to lock either in the closed position, substantially as described.

6. In a weighing scale of the type indicated, the combination with the weighing hopper provided with two compartments, and gates for closing the same, of a deflector pivoted in the upper central portion of the hopper and provided with an extended lever arm and opposite counterbalance weights whereby it is held in the inclined position required to discharge material into a hopper compartment, a stop for arresting the movement of the deflector and holding it in the required position, and means operatively connecting the deflector with the hopper gates whereby all are shifted simultaneously, substantially as described.

7. The combination with the weighing hopper having its lower end provided with converging flanges, a band attached to the outer side of the same and extended downward, and a gate hinged to the hopper and adapted to close upward inside the band and against the flanges of the hopper, substantially as described.

8. The combination with the weighing hopper having a central vertical partition and gates hinged to the lower ends of the compartments and adapted to close upward as described, of a plate attached to the partition and depending from and thus forming a practical continuation of the same, substantially as described.

9. The combination with the frame, the weighing hopper and weighing levers on which the same is supported, of supporting brackets attached to the frame and having forks which embrace the pivoted ends of the weighing levers and thus serve as guides and guards preventing lateral displacement of the levers, substantially as described 10. The combination with the frame, the weighing hopper, weighing levers whereon the hopper is supported, the means of support comprising brackets or castings secured to the hopper and provided with lateral sockets and extensible arms secured in said sockets, their outer ends bearing upon the weighing levers, substantially as described.

11. The improved means for support of the weighing hopper upon the weighing levers, consisting of castings adapted to be secured to the hopper and having lateral projections provided with sockets, arms adapted to slide in said sockets and screws for clamping the same in any adjustment, the outer ends of the arms being constructed for pivotal contact with the weighing levers, substantially as described.

JOHN H. McLEOD.
ANGUS McLEOD.

Witnesses:
Z. H. MOORE,
HENRY C. WATERS, Jr.